United States Patent
Levitt et al.

(10) Patent No.: US 6,592,800 B1
(45) Date of Patent: Jul. 15, 2003

(54) APPARATUS AND METHOD FOR MAKING A MECHANICAL FASTENER

(75) Inventors: Leon Levitt, Mendota Heights, MN (US); James J. Kobe, Newport, MN (US); Robert D. Kampfer, Oakdale, MN (US); Brian T. Hargrett, St. Paul, MN (US); Cathleen M. Arsenault, Fridley, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/412,776

(22) Filed: Oct. 4, 1999

(51) Int. Cl.[7] .................................................. B29C 43/46
(52) U.S. Cl. ........................ 264/479; 264/481; 264/167; 264/210.2; 425/373
(58) Field of Search ................................... 264/481, 479, 264/167, 210.2, 296, 310, 313, 319; 425/363, 371, 373

(56) References Cited

U.S. PATENT DOCUMENTS

| | | |
|---|---|---|
| 3,192,589 A | 7/1965 | Pearson |
| 3,527,269 A | 9/1970 | Wylde |
| 3,594,863 A * | 7/1971 | Erb |
| 4,290,832 A | 9/1981 | Kalleberg |
| 4,698,274 A | 10/1987 | Ausnit et al. |
| 4,731,911 A | 3/1988 | Gould |
| 4,875,259 A | 10/1989 | Appeldorn |
| 4,894,060 A | 1/1990 | Nestegard |
| 5,077,870 A | 1/1992 | Melbye et al. |
| 5,212,853 A | 5/1993 | Kaneko |
| 5,242,646 A | 9/1993 | Torigoe et al. |
| 5,398,387 A | 3/1995 | Torigoe et al. |
| 5,505,747 A | 4/1996 | Chesley et al. |
| 5,607,635 A | 3/1997 | Melbye et al. |
| 5,679,302 A | 10/1997 | Miller et al. |
| 5,713,111 A | 2/1998 | Hattori et al. |
| 5,868,987 A | 2/1999 | Kampfer et al. |
| 5,945,131 A * | 8/1999 | Harvey et al. |
| 6,039,911 A * | 3/2000 | Miller et al. |
| 6,054,091 A | 4/2000 | Miller et al. |
| 6,132,660 A * | 10/2000 | Kampfer |
| 6,248,276 B1 * | 6/2001 | Parellada et al. |

FOREIGN PATENT DOCUMENTS

| | | |
|---|---|---|
| DE | 42 20 908 A1 | 1/1994 |
| EP | 0 565 750 A | 10/1993 |
| EP | 0 702 610 B1 | 5/1997 |
| EP | 0 811 332 A2 | 12/1997 |
| EP | 0 830 930 A1 | 3/1998 |
| GB | 1 510 558 | 5/1978 |
| JP | 63-80543 | 10/1989 |
| JP | 4-123106 | 11/1992 |

(List continued on next page.)

OTHER PUBLICATIONS

US 6,129,874, 10/2000, Buzzell et al. (withdrawn)*
Brochure entitled "Hookit II™" The evolution of fastening technology for abrasives by 3M ©1998.

Primary Examiner—Mark Eashoo
(74) Attorney, Agent, or Firm—Melissa E. Buss

(57) ABSTRACT

A method and apparatus for forming a mechanical fastener. A preferred embodiment of the method includes moving a substrate along a web path, where the substrate includes a first major surface and a plurality of stems extending from the first major surface of the substrate and each of the stems includes a stem end, radiantly heating the stem ends to form softened ends, and thereafter deforming the softened ends into convex heads with a deformable surface. A preferred embodiment of the apparatus includes a web conveyor, where the web conveyor defines a web path, a heating source located adjacent the web conveyor and a deformable surface located down the web path from the heating source, where the deformable surface includes a durometer hardness of greater than 10 Shore OO and less than 70 Shore A.

44 Claims, 2 Drawing Sheets

FOREIGN PATENT DOCUMENTS

| | | | |
|---|---|---|---|
| WO | WO 82/02480 | * | 8/1982 |
| WO | 89/08201 | | 9/1989 |
| WO | 92/19119 | | 11/1992 |
| WO | 94/23610 | | 10/1994 |
| WO | 95/19242 | | 7/1995 |
| WO | 98/14086 | | 4/1998 |
| WO | 98/30381 | | 7/1998 |
| WO | 98/57564 | | 12/1998 |

* cited by examiner

APPARATUS AND METHOD FOR MAKING A MECHANICAL FASTENER

TECHNICAL FIELD

The present invention generally relates to a method and apparatus for making a mechanical fastener. The present invention relates more particularly to a method of making a mechanical fastener which includes heating stem ends to form softened ends and thereafter deforming the softened ends into convex heads with a deformable surface. The present invention also relates more particularly to an apparatus for making a mechanical fastener which includes a web conveyor, a heating source located adjacent the web conveyor, and a deformable surface located down the web from the heating source.

BACKGROUND OF THE INVENTION

Various types of mechanical fasteners are known for holding articles together, such as hook and loop type fasteners or complementary pairs of fasteners that engage with one another. The complementary pairs of fasteners typically have engaging surfaces with patterns of stems having heads. Various methods have been used to head the stems of these fasteners. For example, U.S. Pat. No. 5,077,870, "Mushroom-Type Hook Strip for a Mechanical Fastener," (Melbye et al.), describes a method for forming mushrooms on an array of upstanding stems. A web having an array of upstanding stems made of thermoplastic resin is fed between two calendar rolls. The roll that contacts the stems heats the tips of the stems to a temperature exceeding the flow point of the thermoplastic resin. Briefly, Melbye et al. states that maintaining the tips at this temperature allows molecular disorientation to take place. During this time and upon subsequent cooling, the tips draw back to form uniformly shaped mushroom heads, each having an upper, substantially convex surface and a larger cross section than the original stem.

PCT publication WO 98/57564, "Method and Apparatus for Forming Headed Stem Mechanical Fastener Structure, (Kampfer), published on Dec. 23, 1998, describes a method of deforming the hook head portions of hook elements on a web backing. The hook elements on the web backing are fed into a nip formed between a support surface and an upper heated surface having a durometer hardness of less than 90 Shore A. This upper heated surface compressively engages the hook head causing it to turn down and permanently deform. This increases the uniformity of the hook head elements forming a fiber engaging crook region.

U.S. Pat. No. 5,505,747, "Method of Making an Abrasive Article," (Chesley et al.), describes a method for making an abrasive article, including the steps of providing a substrate having abrasive means on one surface, and providing a plurality of hooking stems on the opposite surface thereof. In one preferred embodiment, Chesley et al. describes a method of providing hooking means, in the form of a head adjoining each stem, by heating the stems with a heated plate to thereby deform the distal end of the stem, but may also be provided by contacting the distal ends of the stems with a heated calendering roller to form the heads.

U.S. Pat. No. 3,192,589, "Separable Fastener," (Pearson), describes a method of making a fastener including a plurality of headed studs in a flexible base. In one embodiment, Pearson describes a method of making a fastener that includes two operations. The first step is molding the base integrally with the studs in headless form. The stud lengths have to be such that they contain enough material to form the required size heads for the selected design and should also be tapered enough to facilitate ejection of the unit from the mold. The second operation involves heat softening and upsetting the tips of the studs, such as in a heading die. The heading operation is a relatively slow squeezing action rather than an impact. The die needs to shape the heads only from the top and sides because the combined heat and squeeze action gives an effective rolling upset to the heads.

U.S. Pat. No. 3,527,629, "Method of Producing Fastener Member having Upstanding Fastener Elements Shaped for Releasable Engagement with Cooperating Fastener Elements," (Wylde), describes a method of making a fastener member including a strip of plastic sheet material and a large number of filamentary fastener means each in the form of generally U-shaped metallic wire. In one preferred embodiment, Wylde describes a method of deforming straight upstanding limbs so that they are capable of releasable engagement with like or cooperating elements on another fastener member. The limbs are received in a slot in an anvil which is moved in a direction parallel to the surface of the strip to the position on either side of the limb. The free end of the limb projects above the anvil and is acted on by a downward movement of a former provided with a generally cup shaped recess. The recess is shaped to bend the end of the limb downwardly onto a tapered side of the anvil.

Co-pending U.S. patent application Ser. No. 09/290,751, filed on Apr. 13, 1999, "A Mechanical Fastener and Method for the Same," (Aamodt et al.) discloses a method of making a mechanical fastener that includes placing a layer of heated material on stem ends to soften the stem ends and deforming the softened stem ends into convex heads. In one preferred embodiment, prior to the substrate entering a nip formed between a first and second roller, a layer of heated material is extruded from an extruder onto the tips of the stems. The layer of material is at a temperature high enough to soften the ends of the stems. Heads are then formed on the stems by deforming the softened ends into heads as the substrate, stems and layer of material pass through the nip.

SUMMARY OF THE INVENTION

The present invention provides a method and apparatus for forming a mechanical fastener. One aspect of the present invention provides a method of forming a mechanical fastener. The method of forming a mechanical fastener comprises the steps of: a) moving a substrate along a web path, where the substrate includes a first major surface and a plurality of stems extending from the first major surface of the substrate, and where each of the stems includes a stem end; b) radiantly heating the stem ends to form softened ends; and c) thereafter deforming the softened ends into convex heads with a deformable surface.

In one preferred embodiment of the above method, step c) includes compressing the softened ends with an elastic surface. In another preferred embodiment of the above method, the temperature of the deformable surface is less than the temperature of the softened ends. In another preferred embodiment of the above method, step b) includes heating the stem ends to form molten ends.

In another preferred embodiment of the above method, step c) includes compressing the substrate between a nip formed between a first roller and a second roller, where the second roller includes the deformable surface, where the first roller contacts the substrate opposite the first major surface, and where the second roller contacts the softened ends. In another aspect of this embodiment, the temperature of the deformable surface of the second roller is less than the temperature of the softened ends. In another aspect of this embodiment, the temperature of the deformable surface of the second roller is less than 270° F. In yet another aspect of this embodiment, the deformable surface of the second roller is between 40° F. and 185° F. In another aspect of this embodiment, the deformable surface of the second roller is elastic. In yet another aspect of this embodiment, the deformable surface of the second roller has a durometer hardness between. 10 Shore OO and 70 Shore A. In yet another aspect of this embodiment, the deformable surface of the second roller has a durometer hardness of between 10 Shore OO and 20 Shore OO. In another aspect of this embodiment, the deformable surface of the second roller has a roughness measurement (Ra) of less than 30 micro-inch. In another aspect of this embodiment, the deformable surface of the second roller has a roughness measurement (Ra) of less than 20 micro-inch.

In another preferred embodiment of the above method, step b) includes heating the stem ends to a temperature above 270° F. In another aspect of this embodiment, step b) includes heating the stem ends to a temperature between 270° F. and 600° F. In another preferred embodiment of the above method, the elastic surface has a durometer hardness of less than 70 Shore A. In yet another preferred embodiment of the above method, the elastic surface has a durometer hardness of between 10 Shore OO and 20 Shore OO. In another preferred embodiment of the above method, step b) includes heating the stem ends with an infrared heat source.

In yet another preferred embodiment of the above method, the substrate and the plurality of stems comprise a polymeric material. In another aspect of this embodiment, the polymeric material comprises a thermoplastic material. In another aspect of this embodiment, the thermoplastic material comprises a polyolefin. In yet another aspect of this embodiment, the polyolefin comprises polypropylene.

Another aspect of the present invention provides a mechanical fastener made by any of the methods described above.

Another aspect of the present invention provides an alternative method of forming a mechanical fastener. The method of forming a mechanical fastener, comprises the steps of: a) moving a substrate along a web path, wherein the substrate includes a first major surface and a plurality of stems extending from the first major surface of the substrate, wherein each of the stems includes a stem end; b) radiantly heating the stem ends to form softened ends; and c) thereafter deforming the softened ends into convex heads with a deformable elastic surface, wherein the deformable surface has a durometer hardness of between 10 Shore OO and 70 Shore A, where the deformable surface has a roughness measurement (Ra) between 5 micro-inch and 30 micro-inch, and where the temperature of the deformable surface is less than the temperature of the softened ends.

Another aspect of the present invention provides an apparatus for forming a mechanical fastener. The apparatus for forming a mechanical fastener, comprises: a) a means for moving a substrate along a web path, where the substrate includes a first major surface and a plurality of stems extending from the first major surface of the substrate, and where each of the stems includes a stem end; b) a means for heating the stem ends to form softened ends; and c) a means located down the web path for deforming the softened ends into convex heads, where the means for deforming includes a deformable surface having a durometer hardness between 10 Shore OO and 70 Shore A.

In one preferred embodiment of the above apparatus, the deformable surface is elastic. In another preferred embodiment of the above apparatus, the deformable surface has a durometer hardness of between 10 Shore OO and 20 Shore OO. In yet another preferred embodiment of the above apparatus, the deformable surface has a surface roughness (Ra) of less than 30 micro-inch.

Another aspect of the present invention provides an alternative apparatus for forming a mechanical fastener. The apparatus for forming a mechanical fastener, comprises: a) a web conveyor, where the web conveyor defines a web path; b) a heating source located adjacent the web conveyor; and c) a deformable surface located down the web path from the heating source, and where the deformable surface has a durometer hardness between 10 Shore OO and 70 Shore A.

In one preferred embodiment of the above apparatus, the deformable surface is elastic. In another preferred embodiment of the above apparatus, the deformable surface has a durometer hardness of between 10 and 20 Shore OO. In another preferred embodiment of the above apparatus, the deformable surface has a surface roughness (Ra) of less than 30 micro-inch.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
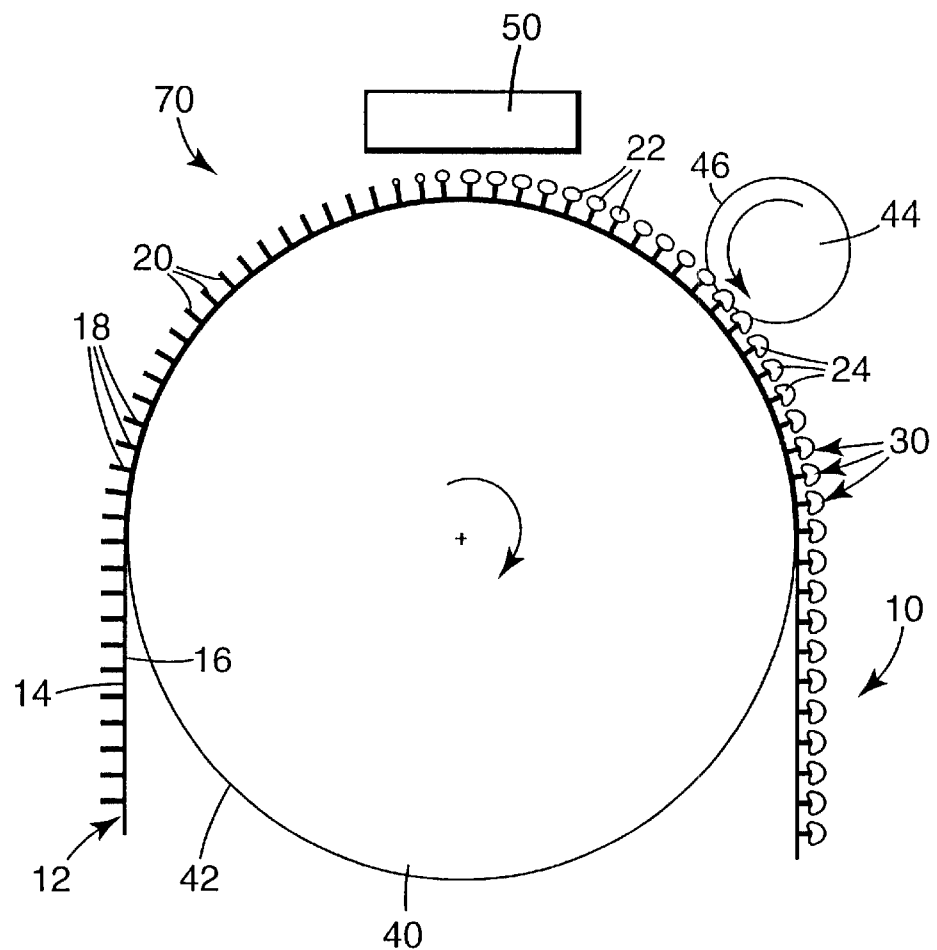
FIG. 1 is a partially schematic side view of an apparatus and method of forming a mechanical fastener according to the present invention.

FIG. 1 is a schematic illustration of a preferred apparatus and method of making the mechanical fastener of the present invention. The preferred apparatus 70 includes a first calendar roller 40, a second calendar roller 44, and a heat source 50. The first roller 40 conveys a substrate 12 including a plurality of stems 18 under heat source 50 and then to a nip formed between a first roller 40 and second roller 44. A substrate 12 including a plurality of stems is conveyed through apparatus 70 to form a mechanical fastener 10.

The substrate 12 includes a first major surface 14 and a second major surface 16 opposite the first major surface 14. The stems 18 extend from the first major surface 14. Each stem 18 includes a stem end 20 located opposite the substrate 12. (The size of the substrate 12 and stems 18 as illustrated are larger than the actual preferred embodiment relative to first and second rollers 40, 44, and heat source 50 for illustrative purposes.) Preferably, the substrate 12 and stems 18 comprise a polymeric material. More preferably, the substrate 12 and stems 18 comprise a thermoplastic material. The stems may be distributed in any manner over the entire substrate 12 or over only a portion of the substrate 12. The stems 18 may be lined up with one another or may be offset from one another, and may be in any pattern, arrangement or density. Stems 18 may be any desired shape, size or form.

Figure 5:
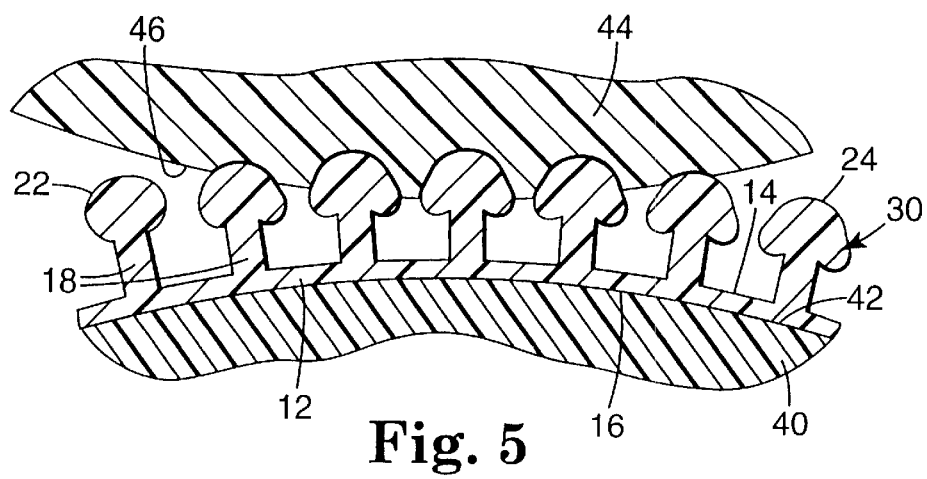
FIG. 5 illustrates a deformable surface deforming softened stem ends into convex heads.

First roller 40 is an example of one preferred web conveyor for conveying the substrate 12 and stems 18. First roller 40 includes an outer surface 42. Outer surface 42 defines a web path for the substrate 12 and stems 18. The second major surface 16 of the substrate contacts the outer surface 42 of the first roller 40. As the substrate 12 and stems 18 are conveyed under the heat source 50, the stem ends 20 face in the direction of the heat source 50. As the stem ends pass under the heat source 50, they are heated to soften the stem ends 20 into softened ends 22. When referring to the stem ends as being "softened," this means that the material is at a high enough temperature to be deformed by a deformable surface. The softened stem ends may be at a sufficiently high temperature that the stem end material is melted, liquefied, or molten. Typically, if the stem ends 20 are heated at a high enough temperature to melt the solid stem material into liquid stem material, then the molten end 22 will often deform into the shape of a bulbous molten end 22, due to the surface tension in the molten stem material. While the stem ends 22 are still in their softened state, the substrate 12 and stems 18 pass through the nip formed between first roller 40 and second roller 44 to form engaging stems 30. The second roller 44 includes a deformable outer surface 46. The deformable surface 46 of the second roller 44 contacts the softened stem ends 22. The deformable surface 46 forces the softened stem ends 22 over and around the periphery of the tips of the stems 18 to form the convex heads 24. At the same time, the deformable surface 46 deforms around the softened ends 22 to form convex heads 24 on the stems 18. (FIG. 5 shows in greater detail how deformable surface 46 deforms the softened ends 22 into convex heads 24.) The heads 24 and stems 18 together form engaging stems 30. Engaging stems 30 and substrate 12 together form mechanical fastener 10. Preferably, as mechanical fastener 10 exits the nip, the mechanical fastener 10 continues in contact with first roller 40 until the mechanical fastener 10 is sufficiently cooled before removing the mechanical fastener 10 from first roller 40.

Preferably, the heat source 50 is positioned adjacent the web path defined along the outer surface 42 of first roller 40 and positioned prior to the nip formed between the first and second rollers 40, 44. Alternatively, heat source 50 may be positioned closer to the first roller 40 or closer to the nip formed between the first and second rollers 40, 44 to heat more of the stem material on the stems ends 20 prior to the nip. The temperature of the heat source 50, the distance between the heat source 50 and the stem ends 20, and the linear speed of the substrate 12 may be optimized to form different shaped softened ends 22 before being compressed by the deformable surface 46 of the second roller 44. Preferably, the heat source 50 is positioned such that the stem ends 20 are heated uniformly across the width of the substrate 12. Preferably, for polypropylene stems, the heat source 50 heats the stem ends 20 to a temperature above 270° F. (132° C.). More preferably, the heat source heats the stem ends 20 to a temperature between 270° F. (132° C.) and 600° F. (316° C.). Preferably, the heat source 50 is a radiant heat source. More preferably, the heat source 50 is an infrared heat source. One example of an infrared heat source is a stainless steel heating block containing cartridge heaters. In addition to radiant heat, the heat source 50 may also heat the stem ends 20 by convection.

Figure 2:
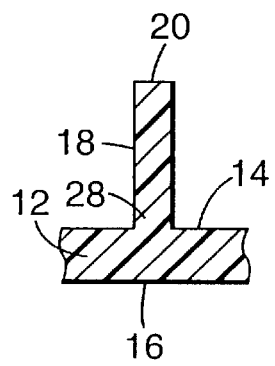
FIG. 2 is a cross-section of a stem extending from a substrate, prior to heating the stem end.

FIG. 2 illustrates a stem 18 prior to heating the stem end 20. Each stem 18 includes a stem base 28 located adjacent the substrate 12 and a stem end 20 located opposite the stem base 28. The stem 18 preferably has a circular cross-section, however this is not required. For example, the stem end 20 may be rounded or in the form of a triangle. The stem 18 is illustrated as having a planar stem end 20, however this is not required. The stem 18 is illustrated as having a constant cross-section throughout the stem 18, however the cross-section could increase or decrease. The substrate 12 and stem 18 are illustrated as integrally molded, however this is not essential.

Figure 3:
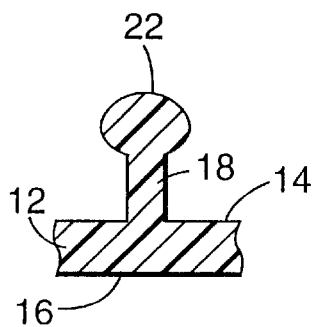
FIG. 3 is a cross-section of the stem of FIG. 2 after heating the stem end to form a softened end.

FIG. 3 illustrates a cross-sectional view of a stem 18 after the stem end 20 has been heated to form a softened end 22. Preferably, only the portion of the stem 18 near the stem end 20 is softened, while the rest of the stem or at least the portion near the stem base 28 is not softened. Preferably, stems 18 are made of a thermoplastic material. Upon heating the stem end 20, the stem material will become soft or melted or liquefied. Preferably, the stem ends 20 are heated sufficiently to melt the material at the stem ends to form bulbous ends. Preferably, while in its softened state, the softened end 22 will maintain its bulbous shape until force is applied to deform the softened end 22 into another shape.

Figure 4:
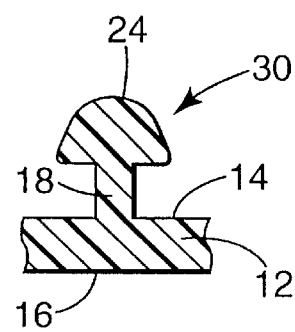
FIG. 4 is a cross-section of the stem of FIG. 3 after deforming the softened end into a convex head with a deformable surface.

FIG. 4 illustrates a cross-sectional view of a preferable engaging stem 30 after the softened ends 22 are deformed by the deformable surface 46 of second roller 44. Engaging stem 30 includes a convex head 24 and stem 18. "Convex" is used herein to describe any contour that slopes away from a plane. The heads 24 preferably have a circular cross-section, however this is not required. The heads 24 preferably have a flat bottom, as illustrated, however this is not required. Also the heads 24 preferably have a sharp transition between the flat bottom and concave surface of the heads 24, however this is not required. When the softened stem ends 20 are deformed by the deformable surface, the softened stem ends 22 may form other cross-sectional shapes, such as ovals. As a result of heating and deforming the stem ends 20 to form heads 24, the original height of the stems 18 is reduced.

FIG. 5 is a cross-section of first roller 40, second roller 44, substrate 12, and stems 18, which is convenient for discussing how the deformable surface 46 of second roller 44 deforms softened ends 22 into convex heads 24. The outer surface 46 of second roller 44 is deformable. The deformable surface should be deformable enough to give the softened head the desired shape. Preferably, the deformable surface moves inward or deflects at least the height of the convex head 24, measured from the bottom of the convex head 24 to the top of convex head 24. Typical heights of the convex heads 24 are 0.01 inches (0.25 mm.), but could be more or less depending on the desired head contour and shape. More preferably, the outer surface 46 of the second roller 44 is elastic. When referring to a surface as being "elastic," this means that the surface returns to or is capable of substantially returning to its original shape after deformation. Preferably, the deformable surface is elastic to allow the surface to be reused for deforming the softened ends 22 into convex heads 24. The nip formed between first and second rollers 40, 44 is less than the height of the stem 18 including the softened end 22. As the substrate and stems 18 are moved along the web path, softened end 22 comes into contact with the outer surface 46 of second roller 44. The surface 46 deforms around the softened end 22, while at the same time the surface 46 applies pressure to the softened end 22 to alter its shape.

Preferably, the deformable surface 46 is unheated, that is, it is not actively heated. However, the temperature of the deformable surface 46 may be above room temperature because of the contact with the softened stem ends 22. By deforming the softened ends with an unheated surface it is possible to cool and solidify the softened material while simultaneously forming the shape of head and to discourage the softened material from sticking to the deformable surface 46. Preferably, the temperature of the deformable surface 46 is less than the temperature of the softened ends 22. The first and second rollers 40, 44 are preferably kept at constant temperatures. Preferably, the temperature of the deformable surface 46 is less than 270° F. (132° C.) when the stem material comprises polypropylene or polyethylene. More preferably, the temperature of the deformable surface 46 is in the range of 40° F. (4.5° C.) and 185° F. (85° C.). The deformable surface may be actively cooled by any means known in the art. For example, the deformable surface may be cooled by internally cooling the second roller 44 or by externally cooling the deformable surface 46.

The durometer and roughness of the deformable surface 46 is selected to achieve the desired shape of the final convex heads 24 of the engaging stems 30. The durometer of the deformable surface 46 may be measured on either a Shore A scale or a Shore OO scale. The Shore A scale is convenient for measuring soft surfaces, whereas the Shore OO scale is convenient for measuring very soft materials. Preferably, the durometer of the deformable surface is more than 10 Shore OO, but less than 70 Shore A. More preferably, the durometer of the deformable surface is in the range of 10 to 50 Shore OO. Most preferably, the durometer of the deformable surface is in the range of 10 to 20 Shore OO. It is advantageous to use a soft deformable surface because it easily deforms around the softened stem ends 22 and provides the desired curvature to the heads 24. Preferably, the deformable surface is also smooth to form a smooth convex head 24. Preferably, the roughness measurement (Ra) of the deformable surface is less than 30 micro-inch (0.76 micro-meters.) More preferably, Ra is less than 20 micro-inch (0.51 micro-meters.) Most preferably, the Ra is less than 5 micro-inch (0.13 micro-meters.)

Preferable deformable surfaces are made from any cross linked elastomer, for example silicone rubber and neoprene rubber. A preferred way of making the second roller 44 is to mold the silicone rubber around a shaft. Such rollers may be obtained from Silicone Products & Technology, Inc. based in Lancaster, N.Y. using Durateck 3300 series silicone rubber.

Preferably, first roller 40 and second roller 44 rotate such that their respective outer peripheries rotate at approximately the same linear speed. However, the relative speed of the rollers 40, 44 may be optimized to form different shaped heads 24. For example, the linear speed of second roller 44 may be greater than the linear speed of the first roller 40 to form convex heads 24 shifted forward with respect to the stem 18. As another example, the linear speed of the first roller 40 may be greater than the linear speed of the second roller 44 to form convex heads 24 shifted backward with respect to the stem 18. As another example, the linear speed of the deformable surface may be just slightly faster relative to the linear speed of the first roller 40, for example 3% faster, to compensate for the reduction of diameter of the second roller 44 having a very soft deformable surfaces to obtain a centered head 24 over the stem 18.

The width or force applied at the nip between first and second rollers 40, 44 is selected to achieve the desired height and shape of the final engaging stems 30. Alternatively, the width of the nip may be determined by setting the positions of the first and second rollers 40, 44 to obtain the desired width. The desired height of the final engaging stems 30 is also effected by the original stem height, the compositions of stem 18, the distance between the heat source 50 and the stem ends 20, line speed of the substrate 12, temperatures of the first and second rollers 40, 44, and compression pressure between the first and second rollers 40, 44. These can be selected by one of skill in the art with the benefits of the teachings of the present invention to provide the desired engaging stem 30. Preferred ranges for these factors for preferred embodiments are included in the examples below.

Figure 6:
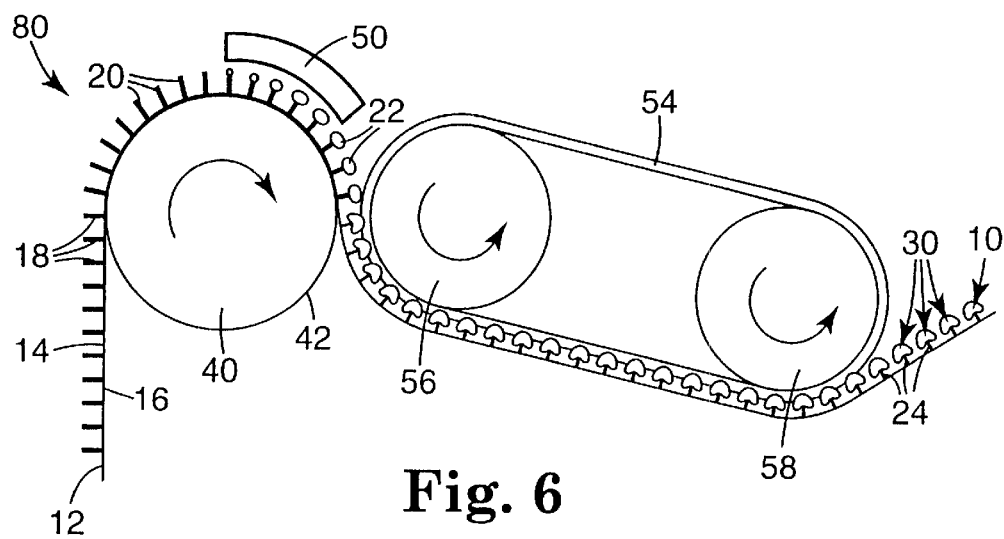
FIG. 6 illustrates a partially schematic side view of an alternative apparatus for forming a mechanical fastener.
Figure 7:
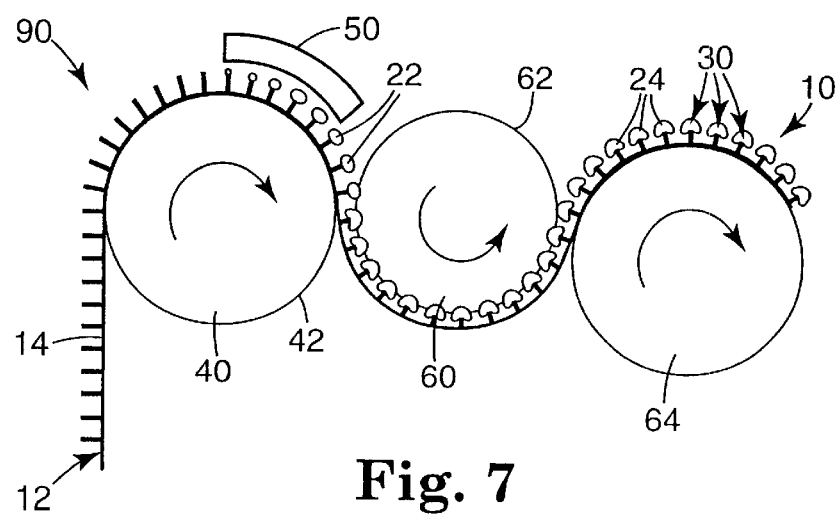
FIG. 7 illustrates a partially schematic side view of another alternative apparatus for forming a mechanical fastener.

FIGS. 6 and 7 illustrate alternative apparatuses 80, 90 for forming mechanical fastener 10. Apparatus 80 of FIG. 6 includes heat source 50, first calendar roller 40, and third roller 56, fourth roller 58, and deformable belt 54 around the third and fourth rollers 56, 58. Apparatus 80 is similar to apparatus 70 described above, except apparatus 80 includes a deformable belt 54 to deform the softened ends 22 into convex heads 24. While the stem ends 22 are still in their softened state, the substrate 12 and stems 18 pass through the nip formed between first roller 40 and belt 54 to form engaging stems 30. Using the deformable belt 54, the softened ends 22 may remain in contact with the deformable surface for more time compared to apparatus 70 illustrated in FIG. 1. Preferable deformable belts are made from any cross linked elastomer, for example silicone rubber and neoprene rubber. Deformable belts 54 may be multiple layered belts or reinforced belts.

Apparatus 90 of FIG. 7 includes heat source 50, first roller 40, a fifth roller 60 including a deformable outer surface 62, and a sixth roller 64. Apparatus 90 is similar to apparatus 70 described above, except the substrate 12 and softened ends 22 continue to stay in contact with the deformable surface 62 of fifth roller 60 until passing through the nip formed between the fifth roller 60 and sixth roller 64. After passing through the nip formed between the fifth and sixth rollers 60, 64, the mechanical fastener 10 continues to wrap around the sixth roller 60. Using fifth and sixth rollers 62, 64 the softened ends 22 are in contact longer with the deformable surface 62 compared to apparatus 70 illustrated in FIG. 1.

As illustrated in FIG. 1 and FIGS. 6–7, roller 40 conveys a substrate 12 including a plurality of stems 18 to a nip formed between two rollers or between a roller and a belt. The present invention is concerned with the method of deforming softened heads with a unheated, elastic deformable surface to form the convex heads. The method of manufacturing the substrate 12 with the stems 18 is not critical. One suitable method of manufacturing the substrate 12 and plurality of stems 18 is disclosed in PCT publication WO 98/57564 (Kampfer), published on Dec. 23, 1998. This publication generally discloses a method of forming stems on a substrate using a preselected thermoplastic resin. The resin is fed by conventional means into an extruder, which melts the resin and moves the heated resin to a die. The die extrudes the resin as a wide ribbon of material onto a mold surface, such as a cylinder having an array of mold cavities in the form of holes. The holes may be located to provide the arrangement of stems in the present invention, for example by drilling the cylinder. Preferably, the holes are tapered to facilitate removal of the solidified resin from the mold cavities. These holes or mold cavities are preferably in the form of straight (i.e., only one axis in the length direction) cavities. The mold cavities can be connected to a vacuum system to facilitate resin flow into the mold cavities. This could require a doctor blade or knife to remove excess material extruded into the interior face of the mold cylinder. The mold cavities preferably terminate in the mold surface having an open end for entry of the liquid resin and a closed end. In this case, a vacuum could be used to partially evacuate the mold cavities prior to entering the die. The mold surface preferably matches that of the die where they are in contact to prevent excess resin being extruded out, e.g., the die side edges. The mold surface and cavities can be air or water cooled, or the like, prior to stripping the integrally molded substrate and upstanding formed stems from the mold surface such as by a stripper roll. This provides a substrate having integrally formed stems of thermoplastic material. Other suitable methods are disclosed in U.S. Pat. No. 5,077,870, "Mushroom-Type Hook Strip for a Mechanical Fastener," (Melbye et al.), and PCT Application No. WO 94/23610, "Mushroom-Type Hook Strip for a Mechanical Fastener" (Miller et al.), published on Oct. 27, 1994.

The mechanical fasteners 10 of the present invention can be produced in long, wide webs that can be wound up as rolls for convenient storage and shipment. The mechanical fastener material in such rolls can optionally have a layer of pressure-sensitive adhesive on the surface of the substrate opposite the engaging stems. Pieces of desired sizes of mechanical fastener can be cut from the roll of fastener material and adhesively or otherwise secured to articles to permit releasable attachment of an article to a second article or substrate.

The mechanical fasteners 10 of the present invention can be engaged with itself, with the engaging stems of another mechanical fastener, or with a loop structure. The fastener of the invention can be used wherever hook and loop or headed fasteners are currently used such as for automotive, electronic, marine, transportation, point of purchase, and automotive aftermarket uses. For example, the mechanical fastener of the invention is useful for attachments such as an abrasive disk to a backup pad, access panels, automotive trim, seat covers, headliners, computer monitor covers, carpet, wall decorations, pictures, signage, and displays; closures such as envelopes, mailers, boxes, and pouches; and assemblies such as cell phones, computer printers, office furniture, office panels, toys, and picture frames.

Preferably, the substrate 12 and the engaging stems 30 of mechanical fastener 10 are integrally molded. The substrate 12 and engaging stems 30 may be made of any thermoplastic resin including engineering polymers. Thermoplastic resins include, but are not limited to: polyesters such as poly(ethylene terephthalate); polyamides such as nylon; poly(styrene-acrylonitrile); poly(acrylonitrile-butadiene-styrene); polyolefins such as polypropylene, and polyethylene; polyurethanes; acetals; polyketones; and plasticized polyvinyl chlorides. The thermoplastic resin may also comprise blends, including polypropylene and polyethylene blends. Copolymers of the foregoing resins can also be used. A preferred thermoplastic resin is a propylene polymer resin such as those available under the trade names Phillips HGZ-180 and Phillips HGX-030-01 from Phillips Sumika Polypropylene Company, Houston, Tex.

The substrate 12 and engaging stems 30 may also include one or more additives, including, but not limited to, powders such as fumed silica, talc, or clay; magnetic, electrically conductive, thermally conductive, electrically and thermally conductive, or nonconductive particulates, fibers; glass or polymeric hollow microspheres, glass or polymeric solid microspheres, expandable polymeric microspheres, anti-static agents, lubricants, wetting agents, flow control agents, tackifying resins, surfactants, pigments, dyes, colorants, coupling agents, plasticizers, and antioxidants.

The physical properties of the resins, such as melt flow index and viscosity, can be modified by adding tackifying resins, powders such as fumed silica, talc, or clay; particulates; fibers; glass or polymeric hollow microspheres, glass or polymeric solid microspheres, lubricants, wetting agents, flow control agents, surfactants, pigments, dyes, colorants, coupling agents, plasticizers, and antioxidants.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLE 1

In this example, the hardness of the deformable surface was varied.

A substrate including a plurality of thermoplastic stems was prepared according to the method disclosed in PCT publication WO 98/57564 (Kampfer), published on Dec. 23, 1998. The substrate and plurality of stems were made of polypropylene polymer resin (commercially available from Phillips Sumika Propylene Company, based in Houston, Tex., under the trade name of Phillips Marlex HGZ-180, melt flow index 18, flexural modulus 270,000 psi). The stem heights were between 1.52 mm to 1.65 mm (0.060 to 0.065 inches), measured from the first major surface of the substrate. The plurality of stems was prepared in a repeat cell pattern described in co-pending patent application Ser. No. 09/290,750, "Mechanical Fastener," filed on Apr. 13, 1999.

Referring to FIG. 1, a 5.1 cm (2 inches) wide substrate and stems on the first major surface were subjected to a radiant heat source provided by a 10.2 cm×12.7 cm (4 inches×5 inches) stainless steel heating block containing five 120 watt cartridge heaters. The temperature of the block was controlled at 464.5° C. (850° F.). The distance between the block and the web conveyor was set at 1.88 mm (0.074 inches), and the web conveyor was moving at 7.9 meters/minute (26 feet per minute). The radiant heat caused melting of the ends of the stems. The softened ends assumed the shape with smallest surface area, which was a sphere.

Referring again to FIG. 1, the softened stems ends were pressed by a 0.45 kg. (one pound) silicone rubber coated roller obtained from Silicone Products & Technology, Inc., based in Lancaster, N.Y., available under the trade name Durateck. The roller was 5.1 cm (2 inches) in diameter with a 10.2 cm (4 inches) face and was installed in bearings. The roller was rotated by the action of the moving substrate, i.e., free rotation. The separation distance between the heated block and the rubber roller was 7.6 cm (3 inches) as measured from a point on the heated block corresponding to the shortest distance between the bottom of the heated block and the web conveyor to the face of the rubber roller. Several surfaces were used to deform the softened stem ends into convex heads. The durometer of the rubber surfaces varied, but included different surfaces having a durometer of 10 Shore OO, 20 Shore OO, 30 Shore OO, 40 Shore OO, and 50 Shore A, as measured at room temperature (22° C.), and the roughness measurements of these surfaces was 0.254 micrometers (10 micro-inches). The stem ends were pressed against the surface of the rubber roller at 22° C. (72° F.) surface temperature of the rubber and under a force of about one pound (0.45 kg.) For each durometer tested, the softened stem end was transformed into a convex head similar to the convex head illustrated in FIG. 4.

EXAMPLE 2

In this example, two samples of substrates including a plurality of thermoplastic stems were prepared, each substrate comprising a different polymeric material.

The first sample was prepared according to the method explained in Example 1, except that the material used for the first substrate and stems was acetal (melt flow index 9, flexural modulus of 380,000 psi, commercially available from BASF Corp., Mount Olive. N.J., under the trade name of Ultraform). The second sample was prepared according to the method explained in Example 1, except for the material used in the second substrate and stems was polyketone (melt flow index 60, flexural modulus of 220,000 psi, commercially available from Shell Chemical Co., Houston, Tex. under the trade name of Carilon) and the temperature of the heated block was 593.5° C. (1100° F.). The radiant heat caused the ends of the stems of both the first substrate and second substrate to melt into a sphere.

The stems with softened ends were pressed by the rubber roller according to Example 1 except that the hardness of the rubber was 20 Shore OO as measured at room temperature (22° C.), the rubber roller was driven at 8.23 meters/minute (27 feet/minute), and a force of about one pound (0.45 kg.) was applied to the rubber roller. The softened stem ends were deformed into convex heads for both of the polymeric materials used.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method of forming a mechanical fastener, comprising the steps of:
    a) moving a substrate along a web path, wherein the substrate includes a first major surface and a plurality of stems extending from the first major surface of the substrate, and wherein each of the stems includes a stem end;
    b) radiantly heating the stem ends to form softened ends; and
    c) thereafter deforming the softened ends into convex heads with a smooth deformable surface, wherein the deformable surface deforms around the softened ends to form the convex heads, and wherein the deformable surface has a durometer between 10 Shore OO and 30 Shore A.

2. The method of claim 1, wherein step c) further comprises compressing the softened ends with an elastic surface.

3. The method of claim 2, wherein the elastic surface has a durometer hardness of between 10 Shore OO and 20 Shore OO.

4. The method of claim 1, wherein the temperature of the deformable surface is less than the temperature of the softened ends.

5. The method of claim 1, wherein step b) further comprises heating the stem ends to form molten ends.

6. The method of claim 1, wherein step c) further comprises compressing the substrate between a nip formed between a first roller and a second roller, wherein the second roller includes the deformable surface, wherein the first roller contacts the substrate opposite the first major surface, and wherein the second roller contacts the softened ends.

7. The method of claim 6, wherein the temperature of the deformable surface of the second roller is less than the temperature of the softened ends.

8. The method of claim 6, wherein the temperature of the deformable surface of the second roller is less than 270° F.

9. The method of claim 8, wherein the deformable surface of the second roller is between 40° F. and 185° F.

10. The method of claim 6, wherein the deformable surface of the second roller is elastic.

11. The method of claim 6, wherein the deformable surface of the second roller has a durometer hardness of between 10 Shore OO and 20 Shore OO.

12. The method of claim 6, wherein the deformable surface of the second roller has a roughness measurement (Ra) of less than 30 micro-inch.

13. The method of claim 12, wherein the deformable surface of the second roller has a roughness measurement (Ra) of less than 20 micro-inch.

14. The method of claim 1, wherein step b) includes heating the stem ends to a temperature above 270° F.

15. The method of claim 14, wherein step b) includes heating the stem ends to a temperature between 270° F. and 600° F.

16. The method of claim 1, wherein step b) includes heating the stem ends with an infrared heat source.

17. The method of claim 1, wherein the substrate and the plurality of stems comprise a polymeric material.

18. The method of claim 17, wherein the polymeric material comprises a thermoplastic material.

19. The method of claim 18, wherein the thermoplastic material comprises a polyolefin.

20. The method of claim 19, wherein the polyolefin comprises polypropylene.

21. The method of claim 19, wherein the polyolefin comprises polypropylene.

22. A method of forming a mechanical fastener, comprising the steps of:
    a) moving a substrate along a web path, wherein the substrate includes a first major surface and a plurality of stems extending from the first major surface of the substrate, and wherein each of the stems includes A stem end;
    b) radiantly heating the stem ends to form softened ends; and
    c) thereafter deforming the softened ends into convex heads with a smooth deformable elastic surface, wherein the deformable surface has a durometer hardness between 10 Shore OO and 30 Shore A, wherein the deformable surface has a roughness measurement (Ra) between 5 micro-inch and 30 micro-inch, and wherein the temperature of the deformable surface is less than the temperature of the softened ends, and wherein the deformable surface deforms around the softened ends to form the convex heads.

23. A method of forming a mechanical fastener, comprising the steps of:
    A) moving a substrate along a web path, wherein the substrate includes a first major surface and a plurality of stems extending from the first major surface of the substrate, and wherein each of the stems includes a stem end;
    b) radiantly heating the stem ends to form softened ends; and c) thereafter deforming the softened ends into convex heads with a smooth deformable surface, wherein the deformable surface deforms around the softened ends to form the convex heads, and wherein the convex heads include a convex surface, a flat bottom opposite the convex surface, and a sharp transition between the flat bottom and the convex surface.

24. The method of claim 23, wherein the deformable surface has a durometer between 10 Shore OO and 30 Shore A.

25. The method of claim 24, wherein the elastic surface has a durometer hardness of between 10 Shore OO and 20 Shore OO.

26. The method of claim 23, wherein step c) further comprises compressing the softened ends with an elastic surface.

27. The method of claim 23, wherein the temperature of the deformable surface is less than the temperature of the softened ends.

28. The method of claim 23, wherein step b) further comprises heating the stem ends to form molten ends.

29. The method of claim 23, wherein step c) further comprises compressing the substrate between a nip formed between a first roller and a second roller, wherein the second roller includes the deformable surface wherein the first roller contacts the substrate opposite the first major surface, and wherein the second roller contacts the softened ends.

30. The method of claim 29, wherein the deformable surface of the second roller is elastic.

31. The method of claim 29, wherein the deformable surface of the second roller has a durometer hardness between 10 Shore OO and 70 Shore A.

32. The method of claim 29, wherein the deformable surface of the second roller has a durometer hardness of between 10 Shore OO and 20 Shore OO.

33. The method of claim 29, wherein the deformable surface of the second roller has a roughness measurement (Ra) of less than 30 micro-inch.

34. The method of claim 33, wherein the deformable surface of the second roller has a roughness measurement (Ra) of less than 20 micro-inch.

35. The method of claim 29, wherein the temperature of the deformable surface of the second roller is less than the temperature of the softened ends.

36. The method of claim 29, wherein the temperature of the deformable surface of the second roller is less than 270° F.

37. The method of claim 36, wherein the deformable surface of the second roller is between 40° F. and 185° F.

38. The method of claim 23, wherein step b) includes heating the stem ends to a temperature above 270° F.

39. The method of claim 38, wherein step b) includes heating the stem ends to a temperature between 270° F. and 600° F.

40. The method of claim 23, wherein the elastic surface has a durometer hardness of less than 70 Shore A.

41. The method of claim 23, wherein step b) includes heating the stem ends with an infrared heat source.

42. The method of claim 23, wherein the substrate and the plurality of stems comprise a polymeric material.

43. The method of claim 42, wherein the polymeric material comprises a thermoplastic material.

44. The method of claim 43, wherein the thermoplastic material comprises a polyolefin.

* * * * *